United States Patent Office 3,155,053
Patented Nov. 3, 1964

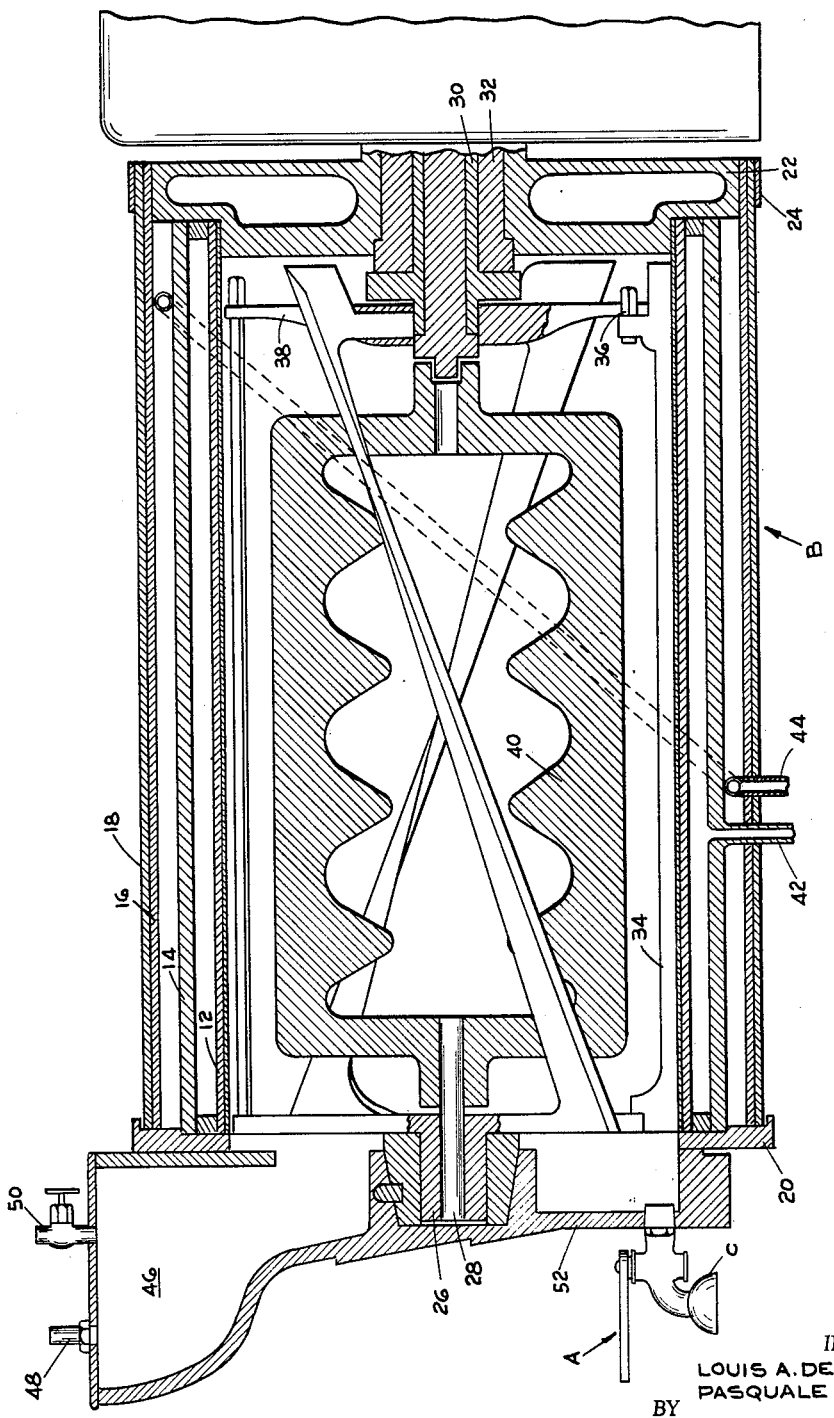

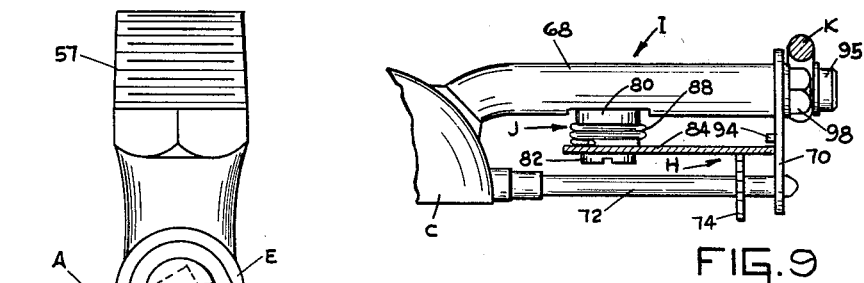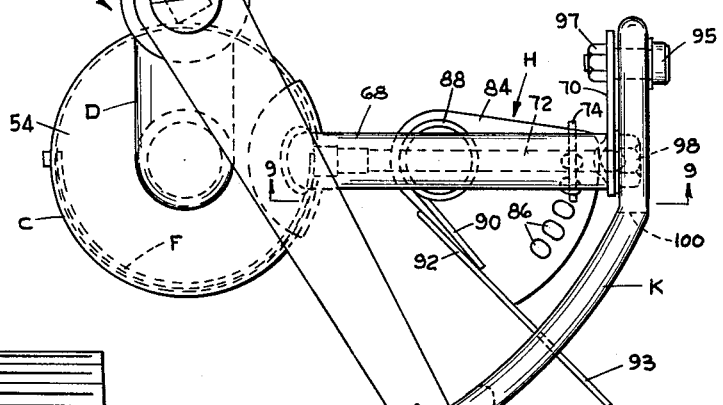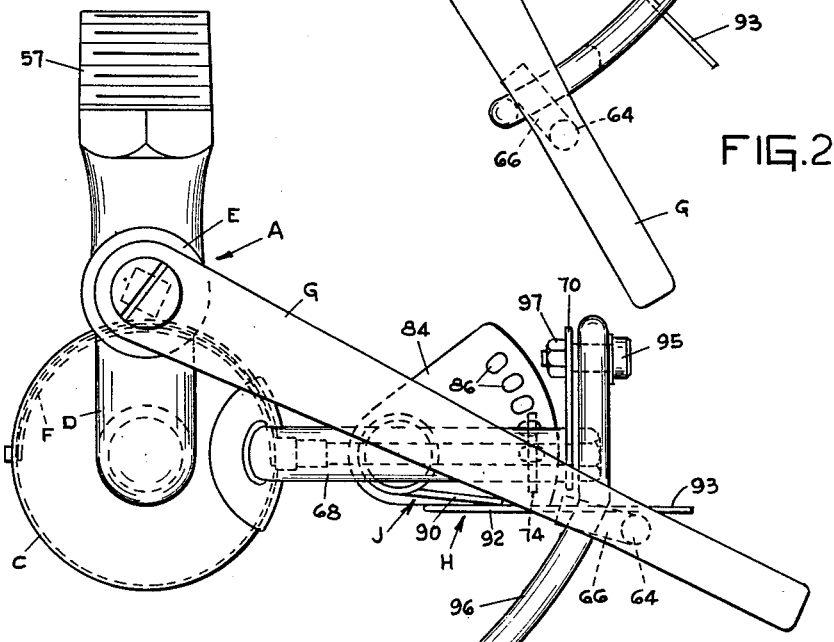

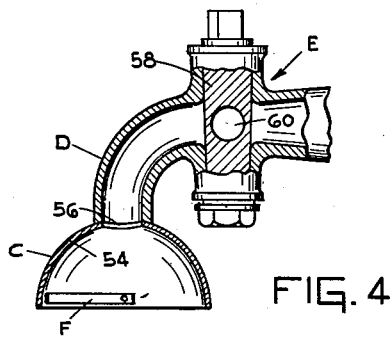
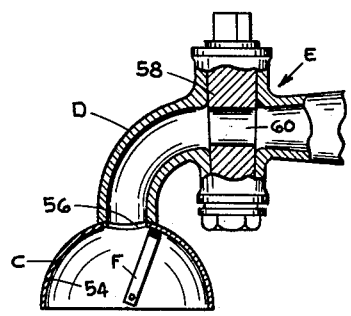
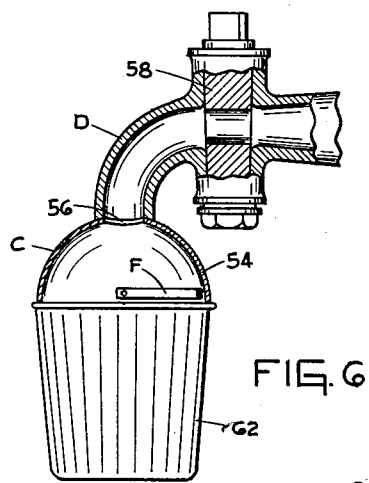
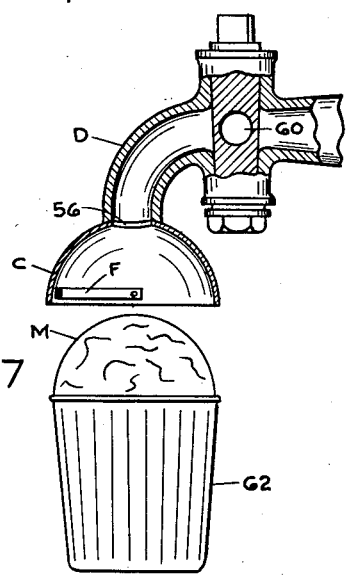
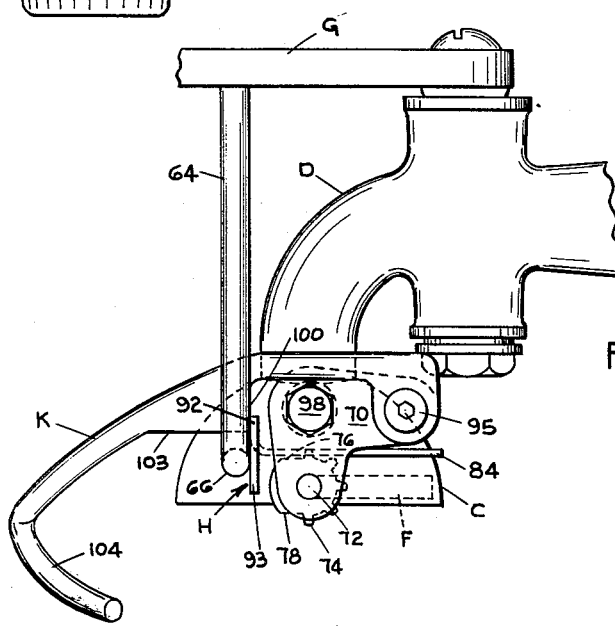

3,155,053
DEVICE FOR DISPENSING SEMI-SOLID
SUBSTANCES
Louis A. De Vito and Pasquale M. De Vito, both of
25 Somerset St., Garfield, N.J.
Filed Apr. 11, 1963, Ser. No. 272,319
6 Claims. (Cl. 107—8)

The invention relates to improvements in apparatus or means for dispensing semi-solid substances in shaped or contoured form.

It has long been recognized that the use of the hand dipper or scoop to furnish molded portions of semi-solid substances, such as ice cream, confectionery ices or the like has many limitations and disadvantages. In busy establishments, the physical effort of frequent and continuous scooping of the ice cream or confectionery ices from the usual container or cylinder is fatiguing, particularly where the cream of ices are hard. Also, it is very difficult, when scooping the material manually, to maintain uniformity of dispensed amounts and proper consistency. Further, there is always the possibility that the material exposed in the container may be contaminated by foreign substances.

There have been various prior art devices proposed for dispensing semi-solid material in shaped form automatically and semi-automatically with the purposes in view of eliminating the disadvantages of manual dispensing referred to above. The prior art devices of which we are aware are of relatively complicated structure. In one type of apparatus, the mold, which is generally hemispherical in shape is related to an opening in a cylinder having a piston or ram positioned therein to force the ice cream into the mold. This arrangement requires an additional mechanism to move or slide the mold away from the opening in the cylinder so that the material within the mold may be stripped or ejected from the mold. The cycle is completed by returning the mold into aligned position with the opening in the cylinder.

In another form of prior art device, a cutter is used to deliver a predetermined quantity of semi-solid material to a two-part mold for the shaping of the material. After the mold is closed to shape the charge, the mold must then be opened, and the shaped material stripped from the mold.

In still another form of prior art ice cream dispensing device, a hemispherical mold is provided within which is positioned an arcuate knife essentially as in a manual type of scoop or dipper. The mold is positioned open end up to receive a charge from an orifice in a cylinder containing the material, which is pressed through the orifice and into the hemispherical mold by a ram. In this arrangement, it is necessary that the mold, after receiving the charge, be rotated from its material-receiving position to a position allowing the material to be stripped and dispensed from the mold. This kind of an arrangement requires that the mold be rotated, and also rocked, in order to permit removal of the contents from the mold. Such arrangement also presents sealing problems.

In accordance with our invention, a device is provided for the automatic or semi-automatic dispensing of shaped, semi-solid substances wherein the mold is maintained stationary, thereby eliminating the necessity for mechanisms for imparting linear or rotary movement to the mold. The device of the invention greatly simplifies the dispensing of shaped, semi-solid substances, and by virtue of such simplification, the device of the invention may be used as a simple fixture or attachment to an ice cream or confectionery ice-making machine, thereby permitting the dispensing of shaped portions of ice cream, sherbet, confectionery ices or the like directly from the machine which makes the product. As a result, the intermediate step of packaging the semi-solid substance in a cylindrical container may be eliminated.

These, and other objects, purposes and advantages of the invention will be apparent from the following description, taken in conjunction with the drawings illustrating a preferred embodiment of the invention, in which:

FIG. 1 is a side elevational view of the dispensing device of the invention, the device being shown related to an ice cream or confectionery ice-making machine or freezer, the freezer being shown in vertical cross-section;

FIG. 2 is a top plan view of the dispensing device of the invention, the device being illustrated as a fixture or attachment for use in conjunction with the freezer shown in FIG. 1, this view showing the device in its closed or non-dispensing position;

FIG. 3 is a view similar to FIG. 2, this view showing the relationship of the parts of the device in its open or dispensing position;

FIG. 4 is a vertical cross-sectional view of the mold, stripping knife and related valve when the valve is in closed or non-dispensing position, and the knife is in its initial position within the mold;

FIG. 5 is a view similar to FIG. 4 at the stage when the valve has been opened and the stripping knife has been moved toward but not completely to its cutting position;

FIG. 6 is a view similar to FIGS. 4 and 5, except that the stripping knife is in cutting position, the valve is open and the device is dispensing material into a cup or receptacle positioned to receive the dispensed material;

FIG. 7 shows the relationship of the valve and the stripping knife at the completion of the cycle, after the semi-solid substance has been stripped from the mold and contained in the receptacle positioned adjacent the mold;

FIG. 8 is a partial side elevational view of the device when in material-dispensing position; and FIG. 9 is a fragmentary side elevational view, partly in section, taken approximately in the plane of line 9—9 of FIG. 2.

FIG. 1 shows the device of the invention, designated A, as related to a cylinder and dasher assembly of an ice cream or confectionery ice freezer for directly dispensing shaped portions of a semi-solid substance from the freezer or machine for making the semi-solid ice cream or confectionery ice. The freezer, designated B, does not constitute part of the present invention, and may be of any conventional type, the one illustrated being made by the Emery Thompson Machine and Supply Co. of New York, N.Y. Such known apparatus comprises the usual Freon inner cylinder 12, outer cylinder 14 and still a third cylinder 16 of cork which surrounds the outer cylinder. The assembly of cylinders is encased in an outer jacket 18 of stainless steel. The cylinders are maintained in their desired relationship by a head 20 at one end and a back jacket 22 at the other end, the back jacket being maintained in position by a cylinder band 24. A central bearing 26 is provided at one end to receive a whipper pin 28, the opposite end of the assembly being provided with a central bushing 30 which is surrounded by a jacket bushing 32.

For the manufacture of ice cream, the assembly includes side scraper blades 34 supported by studs 36 on a yoke member 38 and a whipper 40. Where the freezer is used to produce confectionary ices, the whipper is omitted. The freezer is provided with the usual inlet tube 42 and a suction line 44 incorporating air in the product when making ice cream or sherbet. The front end of the machine is provided with a mixing compartment 46 having in communication therewith a line 48 which is in communication with a compressor (not shown). A valve 50 permits the venting of air in the event the pressure within the unit becomes excessive.

In the showing of FIG. 1, the dispensing device A is in the form of an attachment or fixture which may be threaded into the wall 52 at the front of the mixing compartment, thereby utilizing the pressure within the freezer unit to feed or deliver the ice cream, sherbet, or confectionery ice to the dispensing device A.

In accordance with the invention generally, the device A, which is more particularly shown in FIGS. 2 to 9, includes a mold C and a flow line or conduit D in communication with the interior of the mold. The flow line has a valve E positioned therein. A knife F is positioned to sweep across the interior of the mold C to separate material therefrom. A handle G is connected to the valve E to operate the latter. Transmission means H, carried in part by support means I, transmits movement of the handle G, when the handle is moved to open the valve E, to the knife F to rotate the latter from its initial position (FIGS. 2 and 4) to material-cutting position (FIGS. 3 and 6). Spring means J acts to urge or bias the knife back to its initial position. A trigger K is provided to releasably hold the knife F in material-cutting position in opposition to the spring J. When the operator actuates or trips the trigger K, the knife F is rotated back to its initial position, cutting through semi-solid material which has been fed into mold C, and concomitantly the handle G is rotated from the position where the valve E is open to the position where the valve is closed.

In greater detail, the dispensing device A comprises a hollow, open sided mold C which is preferably hemispherical in shape, such as in the ordinary ice cream dipper or scoop. However, unlike the continuous, unbroken arc of revolution for the mold wall, such as in the ordinary scoop or dipper, the mold wall 54 is provided with an opening or orifice 56, which is preferably located centrally of the mold. In effect, the mold is located at the end of a faucet, spigot or ball cock fixture in that the orifice 56 is in communication with the flow line D which delivers the semi-solid material to the mold through the orifice. The valve E, which may be an ordinary plug valve 58 having the usual bore 60 extending therethrough, is positioned in the flow line D adjacent or fairly close to the orifice 56.

In the form of the invention illustrated, the device is in the form of a fixture adapted for connection to the freezer B shown in FIG. 1, the flow line D terminating in a threaded portion 57 opposite the end having the mold C thereon, thereby enabling a simple, threaded connection with a matingly threaded portion in the wall 52 near the lower end of the mixing compartment 46. The mold C may be attached to the flow line D in any suitable manner, as by welding the mold wall to the flow line at the junction of the parts, or adjacent the orifice 56.

The mold C is provided with a stripper which, as illustrated, is preferably in the form of an arcuate knife F, such as used in the ordinary manual type of ice cream scoop. Also, as in the usual manual form of ice cream scoop, the knife is provided with means extending exteriorly of the mold so the knife may be moved from its initial position on one side of the mold (FIGS. 3 and 6), where it is located in material cutting position to strip or cut the semi-solid substance from the mold upon its return to initial position.

As will be evident from FIGS. 1, 4 and 7, the semi-solid material within the freezer B, under the usual pressure within the freezer, is forced against the closed plug valve 58. To permit the semi-solid material to be received within the mold C, the valve 58 is opened by turning the handle G from the position shown in FIG. 2 to the position shown in FIG. 3. As the handle G is rotated from valve-closed to valve-open position, the transmission means H causes the knife F to be rotated to the position shown in FIG. 5, where the knife has cleared the orifice 56 prior to the knife reaching the material-cutting position of FIGS. 3 and 6. The semi-solid material, under pressure, commences to enter the mold C after the knife F has moved beyond the orifice 56, as shown in FIG. 5. Also, the movements of the valve and knife are related so that when the knife returns from its material-cutting position (FIGS. 3 and 6) to its initial position (FIGS. 2, 4 and 7), the valve will be closed before the knife reaches the orifice 56. A receptacle or cup 62 is held by the operator adjacent the open side of the mold to receive the dispensed material M, which at the completion of the cycle has the contour of the mold imparted thereto as shown in FIG. 7.

As shown in FIGS. 2, 3, 8 and 9, the transmission means H, which is connected to the handle G includes a substantially L-shaped extension 64 fixed at its top end to the underside of the handle G, the lower end of the extension being provided with a short, substantially horizontal leg 66. The mold C has fixed to its exterior or outer surface the support means I, which includes an elongated supporting rod 68. The rod carries at its outer or free end a substantially vertically extending bracket 70. The arcuate knife F, which has its free ends supported in suitable openings at diametrically opposite sides of the mold adjacent the bottom periphery thereof is fixed to a shaft 72, which projects from the mold and has the free end thereof extending into an opening or bearing provided in the bracket 70. In this manner, the shaft 72 is supported for rotation and enables the knife F to be rotated.

The shaft 72 has a gear 74 fixed thereto for rotation therewith. The gear is located adjacent the bracket 70 and inwardly thereof. The gear has teeth extending only around approximately 180° of its periphery, the remainder of the gear having, as shown in FIG. 8, opposed portions 76 and 78 which act as stops.

As shown in FIG. 9, a pin 80 having a head 82 is fixed to and extends downwardly from the rod 68. A gear sector 84 is rotatably supported by the pin 80 and is located on the upper side of the pin's head end 82. The gear sector is in the form of a flat plate having openings 86 (FIGS. 2 and 3) which receive and mesh with the teeth of the gear 74. The spring means J is in the form of a coiled spring 88 surrounding the pin 80, with one end of the spring fixed to the rod 68 and the opposite end 90 engaging a projection 92 in the form of a lip extending upwardly from one side of the gear plate 84. As shown in FIGS. 2, 3 and 8, the lip 92 extends laterally to provide a vertically extending portion 93 adapted to be engaged by the downwardly extending arm 64 of the handle G. Fixing the end of the spring to the rod 68 may be accomplished by forming a hole in the rod and extending the spring end into same. Thus, the spring 88 normally urges the gear plate 84 to turn in a clockwise direction from the position of FIG. 3 to the position of FIG. 2. As shown in FIG. 9, the bracket 70 has a projection 94 extending laterally over the free edge of the gear plate 84 to assure that the latter will be maintained in engagement with the gear 74.

When the gear plate 84 is in the position shown in FIGS. 3 and 8, the stop portion 76 of the gear 74 engages the under side of the gear plate 84 to limit the extent that gear 84 may be turned in a clockwise direction. When the gear plate 84 is in the position shown in FIG. 2, the opposite stop portion 78 engages the under side of the gear plate to limit the extent of clockwise turning. The parts are so designated that when the gear 84 is turned from the position of FIG. 2 to the position of FIG. 3, the knife F will be turned from its position on one side of the mold (FIGS. 2 and 4) to the position on the opposite side of the mold (FIGS. 3 and 6).

The trigger K is in the form of an elongated rod pivotally connected at one end to the bracket 70. As shown in FIGS. 2 and 3, the pivotal connection may take the form of a threaded pin 95 extended through the bracket and secured thereto by a nut 97. The shank of the pin 95 is extended through the end of the trigger arm so that the trigger arm is freely and pivotally connected at such end. The trigger arm extends over a screw 98 located at the end of the rod 68 so that the head of the screw acts as a stop to limit the extent of downward movement of the pivoted trigger arm. The lower limit position of the trigger arm is shown in FIG. 8.

As shown in FIG. 8, the under side of the trigger arm K is provided with a shoulder 100, such shoulder being located along the length of the trigger arm at a point where such shoulder may cooperate with the laterally extending portion 93 of the gear plate 84. The trigger arm is provided with a horizontally extending portion 103 which rides upon the upper edge of the extension 93 when the extension 93 is displaced rearwardly from the position of FIG. 2 to the position of FIG. 3. The free end of the trigger arm K is downwardly turned to provide a hook-like portion 104.

The dispensing device of the invention operates in the following manner. With the ice cream or confectionery ice in the freezer and ready to be dispensed, the operator pushes the handle G to turn it from the position of FIG. 2 to the position of FIG. 3, holding the receptacle 62 under the mold C with the other hand. In rotating the handle G, the handle arm 64, or the horizontally extending leg 66 thereof, engages the projecting portion 93, causing the gear plate 84 to be linearly displaced in opposition to the spring 88. During such movement of the handle, the top edge of the extension 93 slides under the horizontally extending portion 103 of the trigger arm until the projection 93 moves just beyond the shoulder 100 on the trigger arm. The pivoted trigger arm, due to its weight or mass, moves down so that the shoulder 100 engages the front face of the extension 93.

As the handle G is moved from the position of FIG. 2 to the position shown in FIGS. 3 and 8, the stripping knife F is rotated from its initial position through the poistion of FIG. 5 and to the material-cutting position of FIG. 6 and the valve 58 will have opened so that the semi-solid material will flow into the receptacle 62. The operator holds the receptacle in the position of FIG. 6 while the material flows therein. When the operator feels the increase in pressure upon the receptacle, he knows that the receptacle as well as the mold are filled. The operator then manually moves the trigger upwardly from the position shown in FIG. 5, as by moving the end portion 104 upwardly with a finger. This will cause the shoulder 100 to be moved up and out of engagement with the lateral extension 93. As a result, the spring 88 will now return the gear plate 84 to the position of FIG. 2. Such return movement of the gear plate causes rotation of the gear 74, and the rotation of the shaft 72 to which it is fixed, thereby returning the knife from the position of FIGS. 3 and 6 to the position of FIGS. 2, 4, and 7. As a result, the semi-solid material is separated from the mold and assumes the contour as shown in FIG. 7. The handle G is limited in its return movement by the engagement of the extension 66 with the crook of the trigger's hook portion 104, and the valve is closed.

It is believed that the advantages and improved results of the invention will be apparent from the foregoing description of the preferred embodiment of the invention. It will be understood that various changes and modifications may be made without departing from the spirit and scope of the invention as said to be defined in the following claims.

We claim:

1. A device for dispensing semi-solid material in shaped form comprising a mold having an opening extending through the mold wall thereof, a flow line communicating through said opening with the interior of the mold, a valve positioned in the flow line, a knife turnably carried by said mold for sweeping across the interior thereof from initial position on one side of the mold to a starting, material-cutting position on the opposite side of the mold and return, a handle connected to said valve, and transmission means including resilient means related to the handle and the knife for urging the knife from said starting, material-cutting position to initial position and for closing the valve.

2. A device for dispensing semi-solid material in shaped form comprising a hollow, open-sided mold having an opening extending through the mold wall thereof, a flow line in communication through said opening with the interior of the mold, a valve in the flow line adjacent the opening, a handle fixed to the valve, a knife turnably carried by the mold for sweeping across the interior thereof adjacent the inner surface of the mold, transmission means connected to the handle and to the knife for moving said knife from initial position on one side of the mold to a starting, material-cutting position on the opposite side of the mold when the handle is moved to open the valve, and resilient means urging the knife from said starting, material-cutting position to said initial position and acting through said transmission means on said handle to return same to the position wherein the valve is closed.

3. A device for dispensing semi-solid material in shaped form comprising a hollow, open-sided mold having an opening extending through the mold wall thereof, a flow line communicating through said opening with the interior of the mold, a valve positioned in said flow line adjacent said opening, a knife turnably carried by said mold for sweeping across the interior thereof from initial position on one side of the mold to a starting, material-cutting position on the opposite side and return, a handle connected to said valve, transmission means including resilient means related to the handle and the knife for urging said knife from said starting, material-cutting position to initial position and for closing the valve, and a trigger for releasably holding the knife in material-cutting position and for closing the valve.

4. A device for dispensing semi-solid material in shaped form comprising a hollow, open-sided mold having an opening extending through the mold wall thereof, a spigot fixed to said mold at the exterior thereof and communicating through said opening with the interior of said mold, a valve in said spigot, a handle fixed to said valve for opening and closing the valve, a knife turnably supported by the mold for sweeping across the interior thereof adjacent the inner surface of the mold, transmission means connected to the handle and to the knife for turning the knife from initial position on one side of the mold to a starting, material-cutting position on the opposite side of the mold when the handle is turned to open the valve, the transmission means including resilient means for urging the knife from said starting, material-cutting position to initial position and for moving the handle to valve-closing position, and a trigger for releasably holding the knife in material-cutting position and for closing the valve.

5. A device for dispensing semi-solid material in shaped form comprising a substantially hemispherical mold, an orifice in the mold wall, a flow line in communication with said orifice for delivering semi-solid material to the mold, a valve in the flow line adjacent said orifice, a handle arm connected to said valve to open and close the valve, an arcuate knife positioned in the mold to separate the semi-solid material from the mold, knife actuating means extending exteriorly of the mold for moving the knife from initial position side on one side of the mold to a starting, material-cutting position on the opposite side of the mold and return, coacting means provided by the handle arm and knife actuating means whereby movement of the handle arm to valve opening position causes the knife to move to said starting, material-cutting position, resilient means associated with the knife actuating means urging the knife to initial position, and a trigger cooperable with said coacting means provided by the handle arm and the knife actuating means for releasably holding the knife actuating means in said starting, material-cutting position, for returning the knife to initial position and for closing the valve.

6. A device for dispensing semi-solid material in shaped form comprising a substantially hemispherical mold having a wall portion formed with an opening extending therethrough, a flow line connected to the mold communicating through said opening with the interior of the mold, a valve in the flow line, a handle fixed to said valve for opening and closing the valve, an arcuate knife turnably carried by the mold, a shaft fixed to one end of the knife and extending outwardly from the mold substantially along the axis of turning of the knife, a first gear fixed to said shaft, a gear plate meshing with said first gear, support means carried by the mold at the exterior thereof supporting said gear plate, a projection on said gear plate, spring means carried by said support means and acting on said gear plate to urge the latter and said first gear to a position which locates said knife in initial position on one side of the mold, an extension fixed to said handle for engaging said gear plate projection for turning the gear plate in opposition to said spring means when the handle is turned to open the valve and to position said knife on the opposite side of the mold in a starting, material-cutting position, and a trigger pivotally mounted on said support means for engaging said gear plate projection.

References Cited by the Examiner
UNITED STATES PATENTS

| | | | |
|---|---|---|---|
| 1,412,727 | 4/22 | Walsh | 107—8.5 |
| 1,458,224 | 6/23 | Erman | 107—8.5 |
| 1,728,505 | 9/29 | Palmer | 107—48 |
| 1,758,028 | 5/30 | Brown | 107—8.5 |
| 2,638,065 | 5/53 | Tarr | 107—8.05 |
| 2,716,385 | 8/55 | Tarr | 107—8.05 |
| 3,029,750 | 4/62 | Burt et al. | 107—8.05 |
| 3,080,830 | 3/63 | Walter et al. | 107—8.05 |

FOREIGN PATENTS 706,411  3/54  Great Britain.

WALTER A. SCHEEL, *Primary Examiner.*